June 8, 1965 G. LICITIS 3,187,462
ELECTRICALLY PROPELLED AND STEERED TOY VEHICLE
Filed Nov. 15, 1962 7 Sheets-Sheet 1

INVENTOR.
GUNARS LICITIS
BY
Amster & Levy
ATTORNEYS

June 8, 1965 G. LICITIS 3,187,462
ELECTRICALLY PROPELLED AND STEERED TOY VEHICLE
Filed Nov. 15, 1962 7 Sheets-Sheet 2

INVENTOR.
GUNARS LICITIS
BY
ATTORNEYS

INVENTOR.
GUNARS LICITIS
BY
ATTORNEYS

June 8, 1965

G. LICITIS 3,187,462

ELECTRICALLY PROPELLED AND STEERED TOY VEHICLE

Filed Nov. 15, 1962

INVENTOR.
GUNARS LICITIS
BY
*Amster & Levy*
ATTORNEYS

June 8, 1965  G. LICITIS  3,187,462
ELECTRICALLY PROPELLED AND STEERED TOY VEHICLE
Filed Nov. 15, 1962  7 Sheets-Sheet 5

INVENTOR.
GUNARS LICITIS
BY
ATTORNEYS

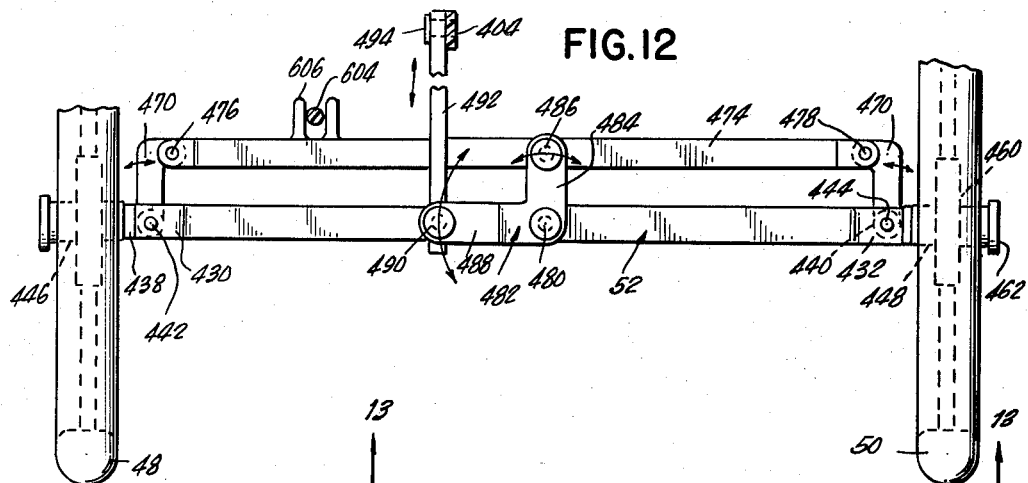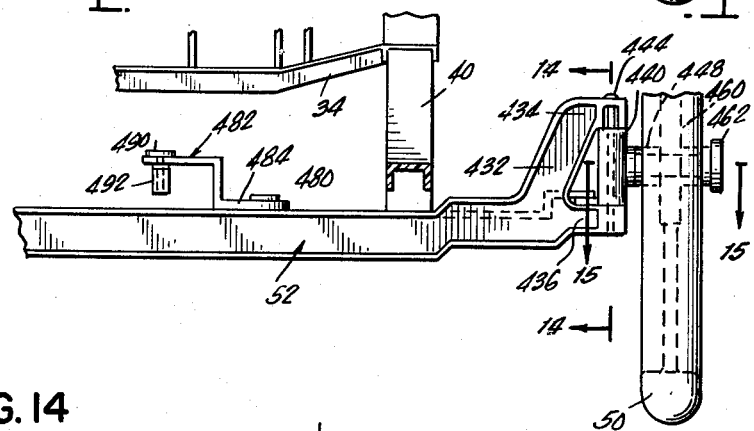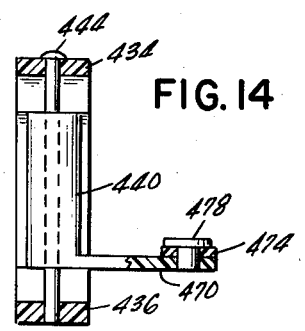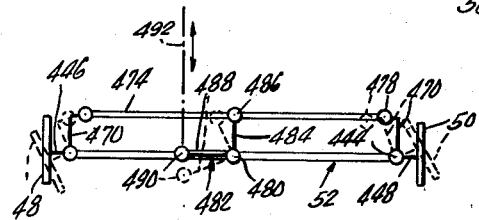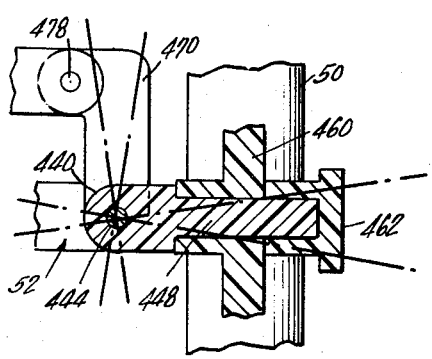

June 8, 1965  G. LICITIS  3,187,462
ELECTRICALLY PROPELLED AND STEERED TOY VEHICLE
Filed Nov. 15, 1962  7 Sheets-Sheet 7

INVENTOR.
GUNARS LICITIS
BY
ATTORNEYS

United States Patent Office 3,187,462
Patented June 8, 1965

3,187,462
ELECTRICALLY PROPELLED AND STEERED
TOY VEHICLE
Gunars Licitis, Chicago, Ill., assignor to Ideal Toy
Corporation, Hollis, N.Y., a corporation of New York
Filed Nov. 15, 1962, Ser. No. 237,954
14 Claims. (Cl. 46—230)

This invention relates generally to a toy model automobile and more specifically to a realistic model automobile provided with a directional control mechanism so that the vehicle is self-propelled with respect to the ground with the directional movement thereof controlled in a pre-determined pattern.

Educators and psychologists have long recognized that some of the most desirable features which should be incorporated in a toy or model intended for use by children reside first in the play value associated with movement of the model in simulation of the movements of the prototype of that model and secondly, in constructing the toy or model from a kit of disassembled pieces, and thirdly in accuracy of detail of the protoype so as to stimulate the imagination of the child. Therefore, it is one of the objects of the present invention to provide a well organized kit including a variety of different pieces which may be easily assembled and secured together to produce a model having movable parts and incorporating faithful reproductions of the components of the prototype.

It is a further object of the present invention to provide a toy model automobile incorporating movable features in simulation to the movable portion of the model prototype so as to be effective to stimulate the imagination of a child playing with the toy or model. In a toy automobile it is desirable to provide movable front and rear wheels with a rear wheel drive and a suitable mounting for the front wheels such that the front wheels may be turned either manually or in a preselected pattern during operation of the toy model. Further, it is desirable to provide internal motor power mounted in a conventional position under the hood of the model vehicle such that the vehicle is propelled either in a forward or reverse direction. In addition, it is desirable to provide means for actuating the head lights and tail lights of the vehicle in response and in timed relation to the operation of the other components of the invention and to provide means simulating the audible sounds of an internal combustion engine as it is operated in the prototype of the model.

Where the model being constructed is patterned after a prototype having moving parts, in addition to it being desirable that such moving members be incorporated into the model, it is further desirable that the mechanical elements which produce such movements be visible to and capable of being assembled by the child playing with the toy. Such features provide a distinct educational advantage involving the mechanisms of assembly of a whole from a group of different parts and further provide an understanding of the mechanical workings of moving machinery. The extraordinary educational value of such kit assemblies has long been recognized, by parents, educators, psychologists, and by those involved in this activity in the toy industry.

Accordingly, it is a further object of the present invention to provide a toy model automobile, having both the educational features involved in assembling a model and the play value associated with the toy having mechanical movements. It is within the contemplation of the present invention to provide a self-propelled toy automobile simulating a 1911 Mercer Raceabout, and wherein the finished toy automobile is self-propelled both in the forward and reverse directions and means are provided for automatically or manually controlling the position of the front wheels of the toy automobile so that the directional movement of the toy model automobile can be further controlled.

It is a still further object of the present invention to provide a toy model automobile having self-propelling mechanisms which may be easily understood by a child playing therewith.

It is a further object of the invention to provide directional control mechanism for a toy vehicle having a drive for propelling the vehicle with respect to the ground and which may also activate a secondary movement of one portion of the vehicle with respect to another portion thereof.

In accordance with the present invention there is provided a self-propelled toy automobile which may be constructed by a child from a kit of separate parts and pieces. The toy automobile comprises a chassis with front and rear wheels supporting the chassis. Under the hood of the toy automobile and in the position normally employed in the prototype for mounting the engine, there is a mounting plate supported by the chassis. In the location in the protoype where there was normally located the fuel tanks of the vehicle there is provided space for batteries which form the source of electrical power for the toy automobile. An electric motor is supported on the mounting plate. An off-on switch is connected to the source of power for controlling the source electric power to the motor. Suitable drive means in the form of a gear reduction assembly are provided for connecting the electric motor to the rear wheels and include suitable drive shafts. The drive means further includes a shaft journalled in the mounting plate. A first cam is mounted on the shaft and there is provided a slide which is guidably mounted on the plate for controlled movements. The first cam engages the slide to reciprocate the slide upon turning of the shaft first in one direction and then in the opposite direction.

A pair of spaced contacts are mounted on the mounting plate and are electrically connected to the off-on switch and in conjunction with a pair of contact pivots mounted on the plates spaced from the contact members and electrically operatively connected to the motor and with a contact flipper having a pair of reversing contacts carried thereby provide a reversing switch arrangement. The reversing contacts pivotally engage the contact pivots and spring means extend between the slide and the contact flipper for urging the contact flipper toward the slide and the reversing contacts against the contact pivots so that the contact flipper is resiliently urged to move in accordance with movement of the slide with the reversing contacts successively engaging the contact members upon turning of the shaft to reverse the polarity of the electric power delivered to the motor from the source.

The drive means further include a clutch. A second cam is mounted on the shaft for engaging and actuating the clutch in timed relation to movement of the first cam so that the clutch will be disengaged between periods of rotation of the first cam in the first direction and in the opposite direction whereby the vehicle will be moved by rotation of the rear wheels sequentially forwardly, stopped, rearwardly and again stopped.

A third cam is mounted on the shaft and suitable, linkage means are connected to the front wheels and include a cam follower engaging the third cam so that upon turning of the shaft the front wheels will be turned in conformance with the contours of the third cam.

The vehicle has a plurality of electric lights mounted on the chassis and a lamp switch is electrically operatively connected to the electric lights and to the source of electric power. There is provided a fourth cam on the shaft which engages the lamp switch for opening and closing the lamp switch in predetermined time relation to operation of the vehicle.

Still further objects of the present invention reside in the provision of a toy model automobile that is capable of being molded out of various readily available and relatively inexpensive material such as polystyrene, or the like, which employs simple electrical circuitry and batteries for electrical power, and which may be manufactured by mass production molding techniques so as to be saleable in a kit form at a reasonable cost so as to permit wide distribution in the hobby field.

These, together with the various ancillary objects and features of the invention which will become apparent as the following description proceeds, are attained by this toy model automobile, a preferred embodiment of which has been illustrated in the accompanying drawings, by way of example only, wherein:

FIG. 12 is a plan view of the mounting arrangement for the front wheels of the toy automobile;

FIG. 13 is a sectional detail view taken along the plane of line 13—13 in FIG. 12 further illustrating the mounting arrangement for the front wheels;

FIG. 14 is an enlarged sectional view illustrating the details of the knuckles used for connection to the front axle for use in mounting the front wheels, the view being taken along the plane of line 14—14 in FIG. 13;

FIG. 15 is an enlarged sectional view taken along the plane of line 15—15 in FIG. 13 illustrating details of construction of a knuckle and kingpin for use in mounting the front wheels on the front axle;

FIG. 16 is a schematic illustration showing the manner in which the front wheel assembly can be moved;

FIG. 21 is a perspective schematic wiring diagram illustrating electrical and mechanical operating components of the embodiment of the invention.

Figure 1:
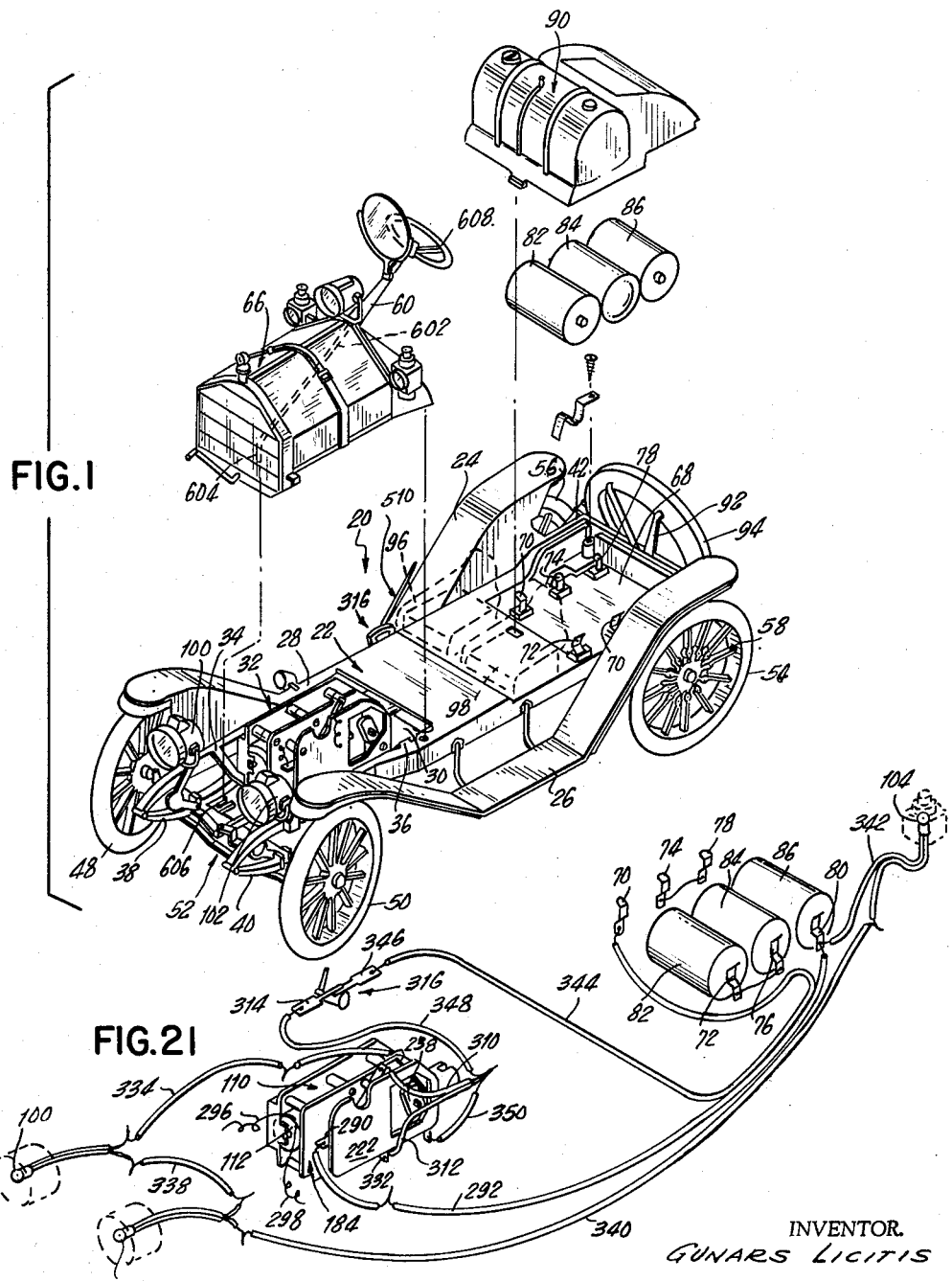
FIG. 1 is an exploded perspective view of a toy model Mercer Raceabout automobile constructed in accordance with the concepts of the present invention.
Figure 2:
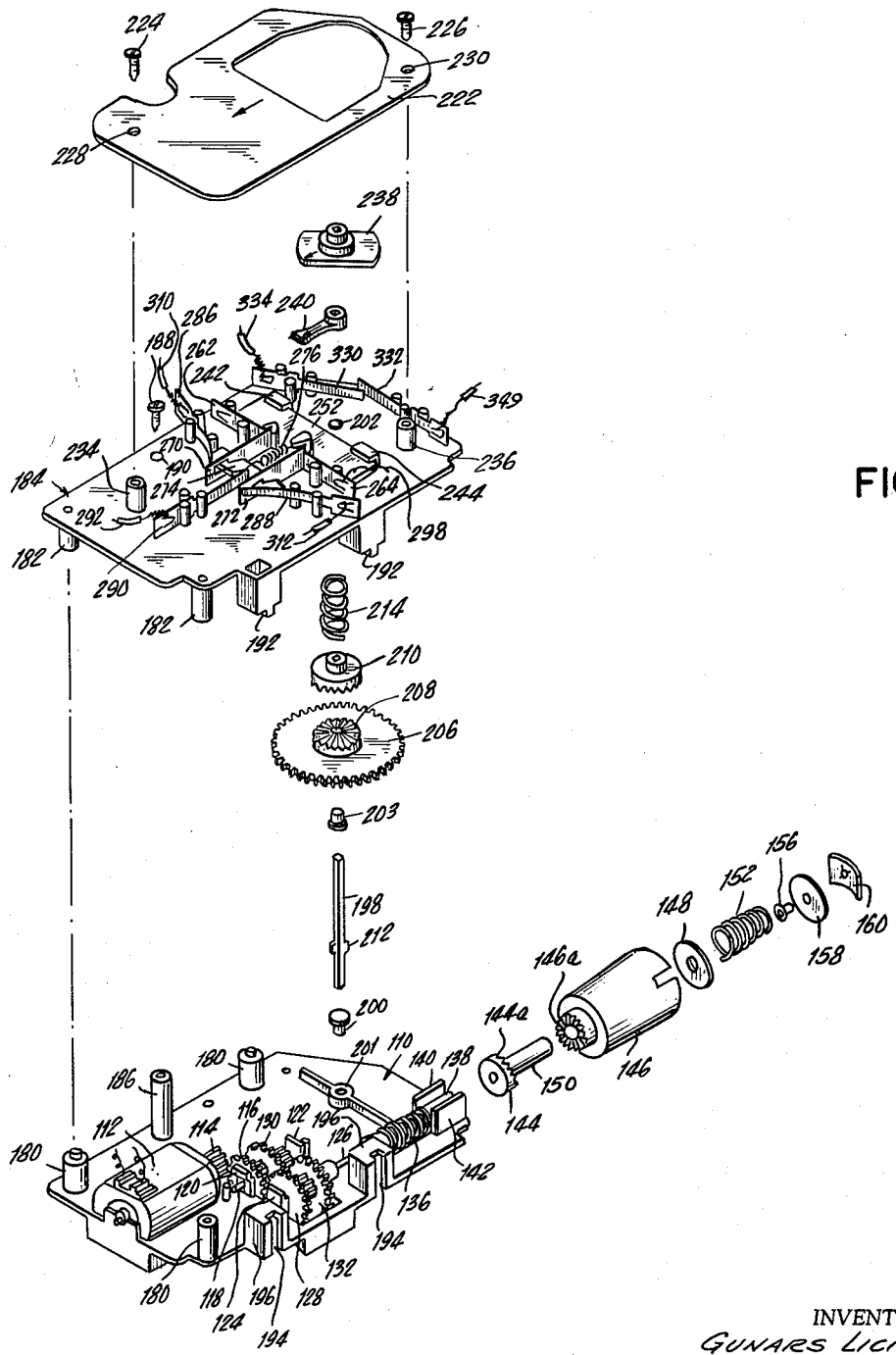
FIG. 2 is an exploded perspective view of the mounting plate, drive mechanisms, reversing switch arrangement and cams used in the illustrated embodiment of the invention.

With continuing reference to the accompanying drawings wherein like reference numerals designate similar parts throughout the various views, reference numeral 20 is used to generally designate the toy automobile of the present invention. In the embodiment of the invention shown, there is disclosed a toy model automobile which has as its prototype the 1911 Mercer Raceabout.

The toy model automobile 20 is preferably constructed mainly of molded plastic parts formed of any suitable material such as polystyrene, which parts are provided in a kit form for assembly by a child or other hobbyist using polystyrene cement for securing and holding most of the parts together.

The chassis 22 of the toy automobile includes right and left fender and running board assemblies 24 and 26. The chassis 22 further includes a forward engine mounting portion 28 provided with a cut-out 30 for supporting the main parts of the directional control mechanism generally indicated at 32 on suitable transverse engine supporting brackets 34 and 36. Secured to the chassis 22 are simulated front springs 38 and 40 and rear springs 42 and 44, see FIG. 10.

The chassis 22 is supported by front wheels 48 and 50 which are mounted on a front axle assembly 52, and by rear wheels 54 and 56 mounted on a rear axle 58 journalled in, and supported by the rear springs 42 and 44 and on bearing mounts 60 and 62 depending from the chassis 22.

A detachable hood assembly 66 is provided for attachment to the chassis 22 in overlying position relative to the directional control mechanism 32. The chassis further includes a rear portion 68 in which battery contacts 70, 72, 74, 76, 78, and 80 are disposed for reception of batteries 82, 84 and 86, the battery terminals being interconnected so that the batteries 82, 84 and 86 are electrically in series connection. A battery cover 90 is adapted to be detachably secured in overlying relationship relative to the batteries 82, 84 and 86, and on the rear portion of the chassis. The battery cover 90 is shaped to conform to the rear contours of the Mercer Raceabout prototype automobile and has the outward appearance of the gasoline tank and other rear portions of the vehicle.

A spare tire mount 92 and a spare tire 94 are carried at the rear of the chassis. Seats 96 and 98 are adapted to be cemented in place on the center portion of the chassis immediately forward of the batteries 82, 84 and 86. Front headlights 100 and 102 are secured to the chassis as is a tail light 104.

The directional control mechanism 32 includes a gear box plate 110 in which an electric motor 112 is mounted. The electric motor 112 drives a shaft having a pinion 114 fixed thereto which drivingly engages a combination gear 116 mounted on a shaft 118 journalled in bearing supports 120 and 122 which are a part of the gear box plate 110. Journalled in a support 124 which is integrally formed with the gear box plate 110 is a shaft 126 which has a combination gear 128 freely rotatable thereon. The combination gear 128 meshes with the pinion of the combination gear 116 and is turned thereby and has its pinion engage the combination gear 130 which is freely mounted on the shaft 118. The combination gear 130 has its pinion in turn drive the combination gear 132 fixed to the shaft 126 so that the gears 116, 128, 130 and 132 serve as a reduction gear assembly for reducing the rotational rate of the shaft 126 considerably with respect to the speed of the motor 112.

Fixed on the shaft 126 is a worm gear 136. A spacer bearing 138 is disposed on the shaft and received between spacer plates 140, 142. A clutch universal 144 is fixedly secured on the shaft 126 and the universal 146 is disposed on the shaft. The universal 146 is held in place by means of a washer 148 which is disposed over the shaft 150 of the clutch universal 144. Compression springs 152 and 154 have the coils thereof inserted into each other and then are disposed over the shaft 150 of the clutch universal 144. An eyelet 156 is disposed on the shaft 126 and the washer 158 is also disposed on the shaft 126. A spring retainer 160 is then pressed onto the shaft so as to engage the washer 158 whereby the springs 152 and 154 will normally urge the universal 146 which functions in conjunction with the clutch universal 144 against the clutch universal 144 so that the teeth 144a mesh with the teeth 146a.

The universal 146 is provided with slots 164 and 166 therein for reception of the transverse end portion 170 of the drive shaft 172.

The gear box plate 110 has a plurality of studs 180 integrally formed therewith which cooperate with studs 182 on mounting plate 184 which serves as a gear box cover to hold the mounting plate 184 in spaced relationship thereto. Also formed integrally with the gear box plate 110 is a post 186 which is internally threaded for reception of a screw 188 which extends through a hole 190 in the plate 184 so as to detachably hold the mounting plate 184 to the gear box plate 110. Hooks 192 depend from the mounting plate 184 and are engageable within slots 194 formed in posts 196 integrally formed with the gear box plate 110.

A square cam shaft 198 is journalled in the gear box plate 110 by means of a metal eyelet 200 which fits within opening 201. An eyelet 203 is utilized to journal gear 206 on the shaft 198, the gear 206 being provided with clutch teeth 208 for engagement with an overriding clutch 210 which is fixed at 212 on the shaft 198. The shaft 198 is journalled in the mounting plate 184 by means of an eyelet 202 and a coil spring 214 is disposed so as to bias the mounting plate 184 and the overriding clutch 210 so as to urge the clutch 210 into engagement with the clutch teeth 208 whereby as the gear 206 which meshes with the worm 136 is driven, the shaft 198 will be rotated. However, when there is any reason for the shaft 198 to be held stationary, the clutch 210 will act as an overrunning so as to prevent breakage of parts, and to permit reversal of movement of the shaft 198.

A cover plate 222 is secured to the mounting plate 184 by means of screws 224 and 226 which extend through apertures 228 and 230 in the cover plate 222 and are threadedly engaged in internally threaded posts 234 and 236 integrally formed with the mounting plate 184. Fixed to the portion of the shaft 198 which extends upwardly of the mounting plate 184 is a light cam 238 and a reversing cam 240.

Integrally formed with the mounting plate 236 are a pair of guides 242 and 244 which cooperate with studs 248 and 250 to slidably mount a slide 252 for movement transverse of the mounting plate 184. The studs 248 and 250 have V-shaped grooves 254 and 256 formed therein for reception of the V-shaped heads 258 and 260 of contact pivots 262 and 264. Reversing contacts 266 and 268 pivotally engage the V-shaped heads 258 and 260 of the contact pivots 262 and 264 and are slotted as at 270 and 272 to receive a contact flipper 274 therein which contact flipper holds the reversing contacts 266 and 268 in spaced relationship. A coil spring 276 is secured to the contact flipper 274 and to a detent 278 on the slide to normally urge the contact flipper towards the slide holding the contact pivots 266, 268 in position and being arranged so that the contact pivots 266 and 268 function as a double pole snap type switch member.

Figure 3:
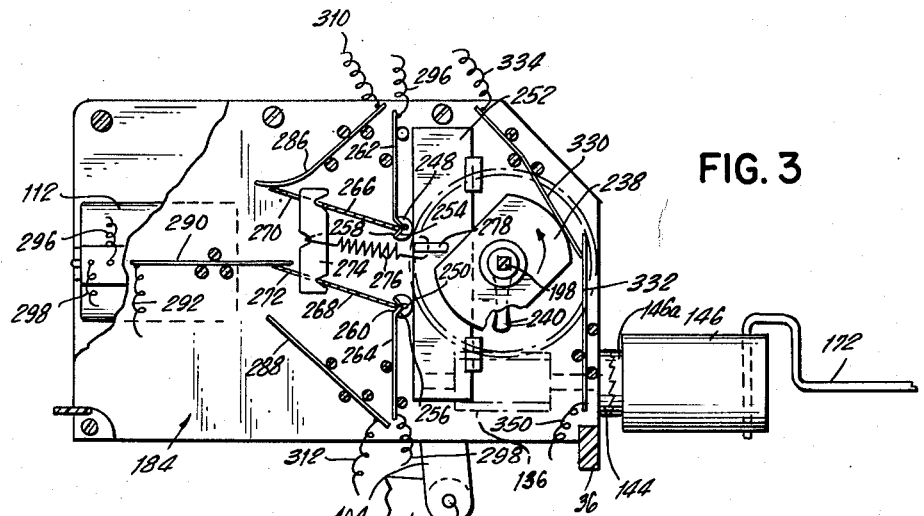
FIG. 3 is an elevational view of the directional control mechanism utilized in the present invention with parts thereof being broken away and shown in section for illustrating details of construction of the invention, and illustrating the various parts in position with the toy model automobile being driven in a forward direction.
Figure 4:
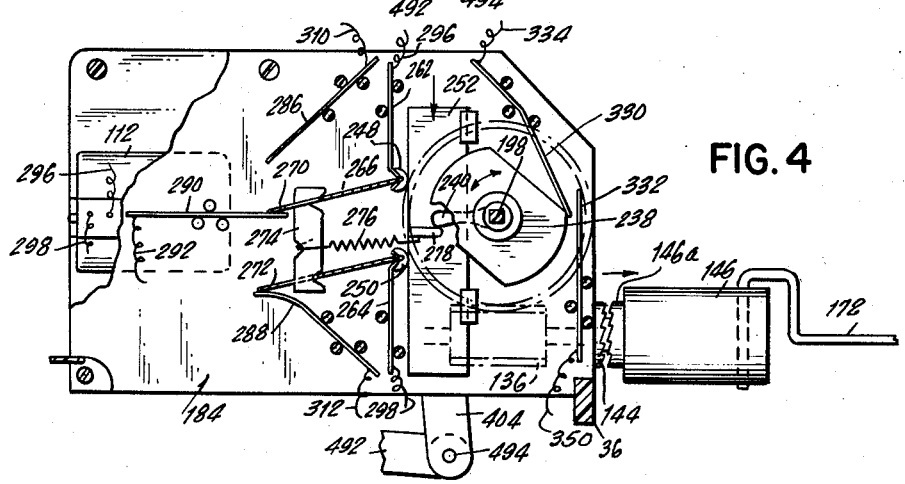
FIG. 4 is a view similar to FIG. 3 but shown with the various parts after operation of the reversing switch mechanism for changing direction of travel of the toy model automobile.
Figure 5:
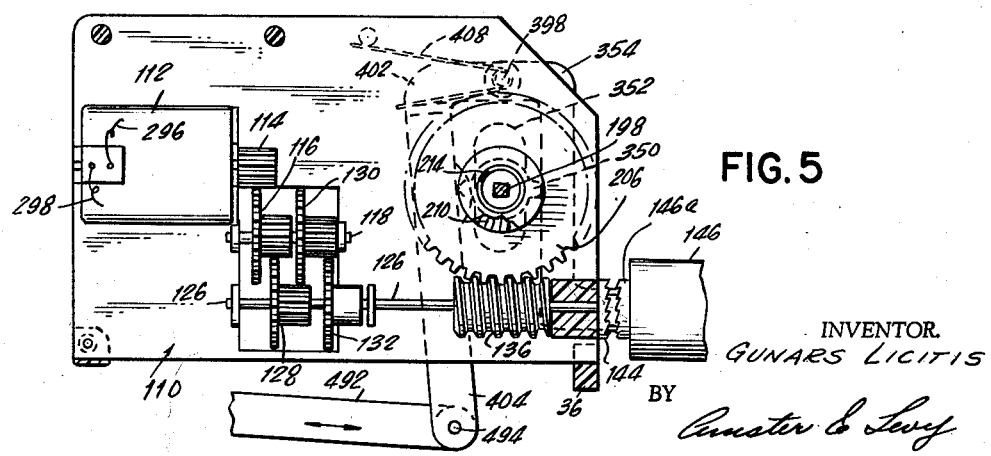
FIG. 5 is an elevational view of portions of the directional control mechanism illustrating the gear reduction drive from the motor and illustrating the clutch arrangement for disengaging the motor from the rear wheels.

A pair of metal spring contacts 286 and 288 are disposed so as to be alternately engageable by the contacts 266 and 268. Further, a fixed contact 290 which is connected by a conductor 292 to the batteries is disposed to be contacted by the other of the contacts 266 and 268 that is not engaging one of the spring contacts 286 and 288. The operation of the reversing switch arrangement including the contact pivots 262 and 264, the contacts 286 and 288, the contact 290, and the contact flipper 274, contacts 266 and 268 and slide 252 is brought about by rotation of the shaft 198 and consequent rotation of the reversing cam 240. The reversing cam 240 is engageable with the detent 278 so that when the cam 240 rotating in a counterclockwise direction as shown in FIG. 3 comes to the position as shown in FIG. 4, it will abut against the detent 278 and push the slide downwardly as shown in FIG. 4. This will cause the contact 274 to be spring pressed downwardly through action of the spring 276 so that the contact 270 is lifted from engagement with the contact 286 and into engagement with the contact 290 and the contact 268 is lifted from engagement with the contact 290 and moved into engagement with the contact 286.

The contact pivots 262 and 264 are connected through conductors 296 and 298 to the motor 112. The spring contacts 286 and 288 are connected through conductors 310 and 312 to the terminal 314 of an off-on switch generally indicated at 316.

The light cam 238 is mounted for rotation on the shaft 198 and is engageable with a light contact 330 to urge the light contact 330 into engagement with another spring-like contact 332. The light contacts 330 and 332 are carried by the mounting plate 184 with the light contact 330 being connected by conductor 334 to the headlight 100 which is connected by conductor 338 to the headlight 102 which is connected by conductor 340 to the tail light 104 which is connected by the conductor 342 to the body terminal 80 and thence to the series connected batteries 82, 84 and 86. The electric circuit between the lights and the batteries is completed by the conductor 334 which is connected to the contact 346 of the switch 316 which in turn is connected by a conductor 348 to a conductor 349 which is connected to the contact 332. The conductor 348 is also used for interconnecting the conductors 310, 312 to the switch contact 314.

When the light cam 238 is in the position as shown in FIG. 3, an operative electrical circuit between the battery and the lamps will be completed causing the lights to become excited. However, when the shaft 198 has rotated so that the light cam 238 is in a position such as is shown in FIG. 4, the contacts 330 and 332 will separate opening the circuit between the batteries and the lamps.

There is also mounted on the cam shaft 198 a clutch cam 350 and a steering cam 352. Pivotally mounted on the gear box plate 110 is a substantially S-shaped clutch lever 354 having a curved end portion 356 adapted ot engage the face 358 of the universal 146 so as to be capable of urging the clutch teeth 146a away from the clutch teeth 144a. As the shaft 198 rotates, the cam 350 will engage the cam lever 354 to move the cam lever to the position where it will actuate the clutch mechanism by engaging the face 358 of the universal 146 to open the teeth 144a and 146a so that there is no longer driving engagement between the motor 112 and the universal 146.

Figure 9:
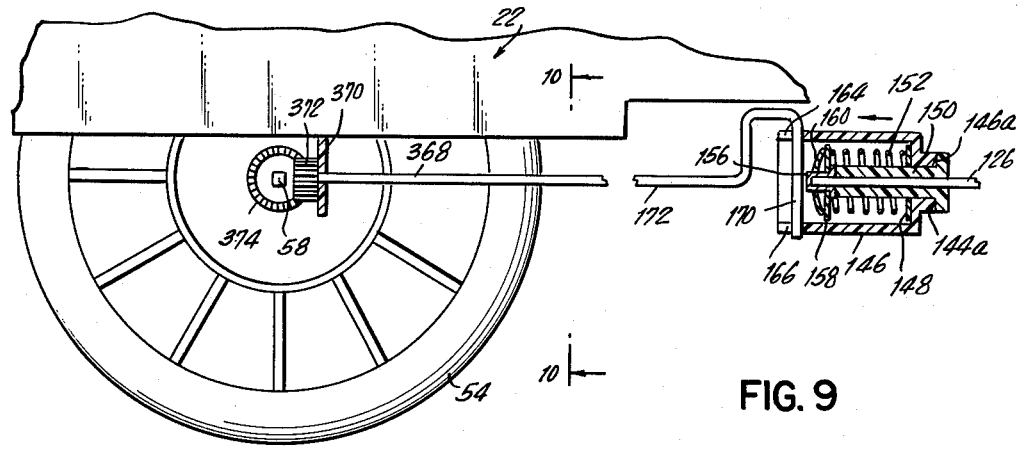
FIG. 9 is an elevational view with parts in section of the means used in connecting the drive means to the rear wheels of the vehicle.
Figure 10:
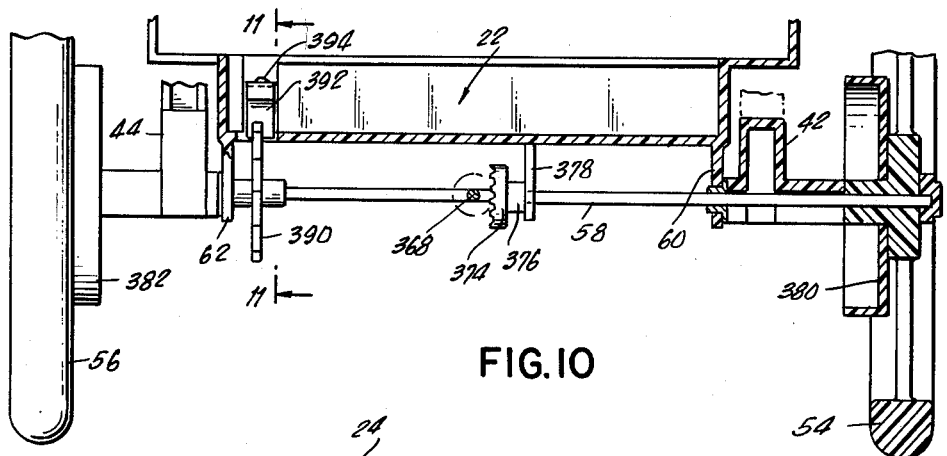
FIG. 10 is a vertical sectional detail view taken along the plane of line 10—10 in FIG. 9 further illustrating the drive means for the rear wheels.
Figure 11:
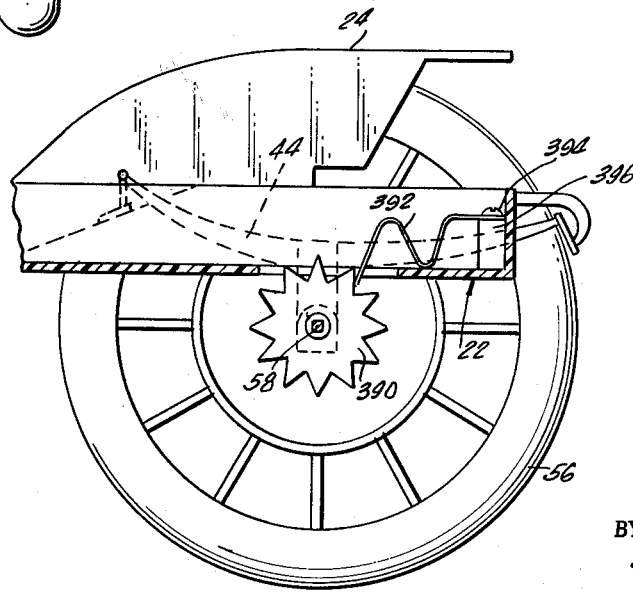
FIG. 11 is a vertical sectional view taken along the plane of line 11—11 in FIG. 10 illustrating the means used for simulating the operating sounds which are expected to come from the prototype of the toy automobile of the present invention.

As can be seen best in FIGS. 9 and 10, the drive shaft 172 which has its end 170 fitting within the slots 164 and 166 in the universal 146 is driven by rotation of the universal. The rear end 368 of the drive shaft 172 is journalled in a support 370 depending from the chassis 22 and has a pinion 372 mounted on the end thereof which is adapted to engage a ring gear 374 fixed to the rear axle 58. The ring gear 374 is held in proper position for engagement with the pinion 372 by its hub 376 which engages a support pin 78 depending from the chassis 22.

Mounted on the rear axle 58 are a pair of simulated brake drums 380 and 382 and rear wheels 54 and 56 are also secured to the rear axle 58 so that rotation of the rear axle will cause rotation of the rear wheels 54 and 56 providing a rear wheel drive when the clutch teth 144a and 146a are in engagement with each other and the motor 112 is operating.

Fixedly secured on the rear axle 58 is a ratchet wheel 390 designed to engage a spring member 392 mounted by means of a screw 394 on a stud 396 integrally formed with the chassis 22. The ratchet wheel will engage the spring upon rotation of the axle 58. The spring 392 will be resiliently urged into engagement with the successive teeth of the ratchet wheel 390 so that a noise similar to that of an internal combustion engine will be achieved.

Also pivoted at the same point 398 that the clutch lever 354 is pivoted to the gear box plate 110 is a steering lever 400 of substantially inverted L-shape having a relatively short horizontal upper arm 402 and a relatively long downwardly extending arm 404 which has a detent 406 integrally formed therewith. A spring 408 is disposed about the pivot 398 and engages a stop 410 of the gear box plate 110 and also engages the detent 406 so as to continuously urge the steering lever 400 against the steering cam 352. The steering cam is of substantially an elliptical shape having a relatively long major axis and a relatively short minor axis with flattened side portions. The steering lever 400 has an arcuate cam follower portion 414 integrally formed therewith and designed to engage each of the knuckles 438 and 440 are provided with integral L-shaped horizontally extending arms 470 and 472 to which a tie-rod 474 is pivotally attached at 476 and 478.

Figure 6:
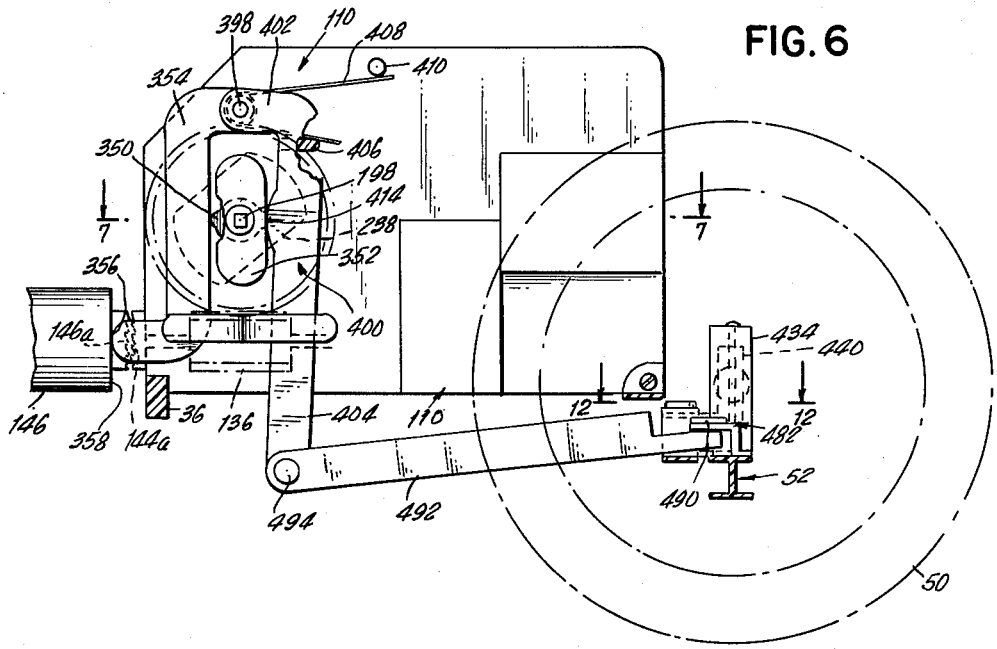
FIG. 6 is a partial elevational view of the directional control mechanism particularly illustrating the cam and linkage used for controlling the position of the front wheels of the vehicles.
Figure 7:
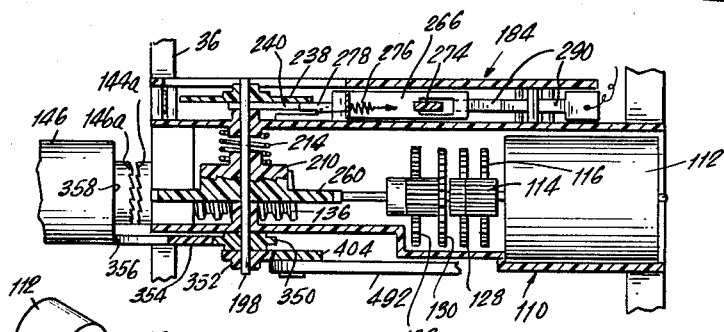
FIG. 7 is a horizontal sectional view taken along the plane of line 7—7 in FIG. 6 particularly illustrating the relative position of the components of the directional control mechanism.
Figure 8:
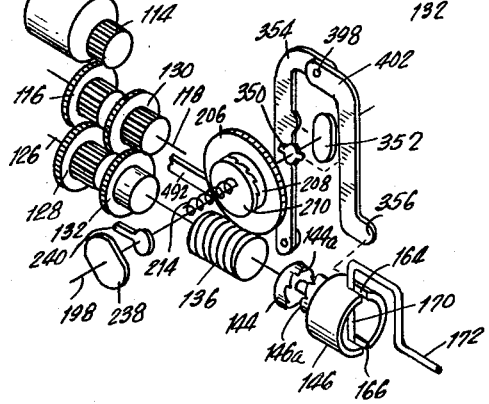
FIG. 8 is a schematic diagram illustrating in perspective the component parts of the directional control mechanism, and particularly illustrating the position of the various cams with respect to each other.

Pivoted at 480 to the front axle 52 is a stepped bell crank lever 482 having a bell crank arm 484 which is pivoted at 486 to the tie-rod 474. The other arm 488 of the bell crank lever 482 is pivoted at 490 to a connecting rod 492 which is also pivoted at 494 to the steering lever 400 at the lower end 404 thereof. The spring 408 will continuously urge the steering lever 400 into engagement with the steering cam 352 so that with the cam in the position as shown in FIG. 6 the wheels will be turned to the right. However, as the cam rotates, the major axis of the cam will attain a horizontal position and will actuate the steering lever 400 to move the connecting rod 492 and hence the bell crank lever to the position as is shown in dotted lines in FIG. 16 with the wheels being turned to the left.

Figure 17:
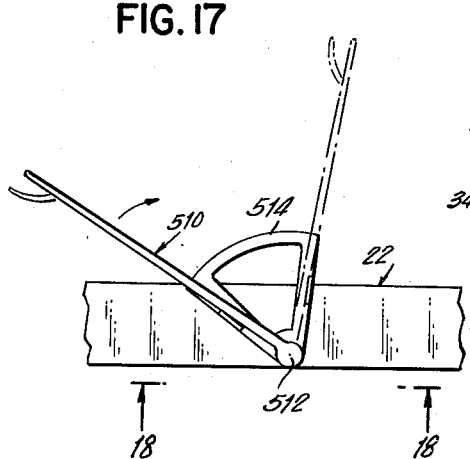
FIG. 17 is an elevational view of the off-on switch employed in the present invention and mounted at a location on the toy automobile corresponding to the location of control devices on the prototype.
Figure 18:
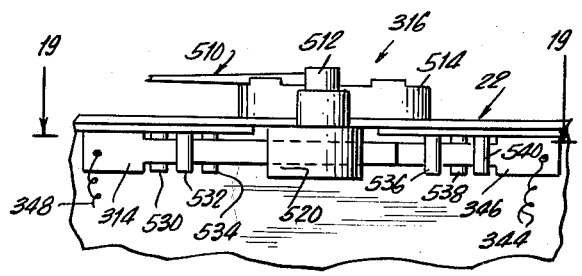
FIG. 18 is a view taken along the plane of line 18—18 in FIG. 17 illustrating details of construction of the off-on switch.
Figure 19:
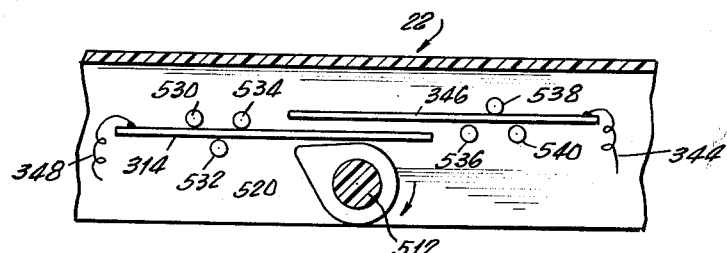
FIG. 19 is an enlarged sectional detail view taken along the plane of line 19—19 in FIG. 18 illustrating further details of the off-on switch.
Figure 20:
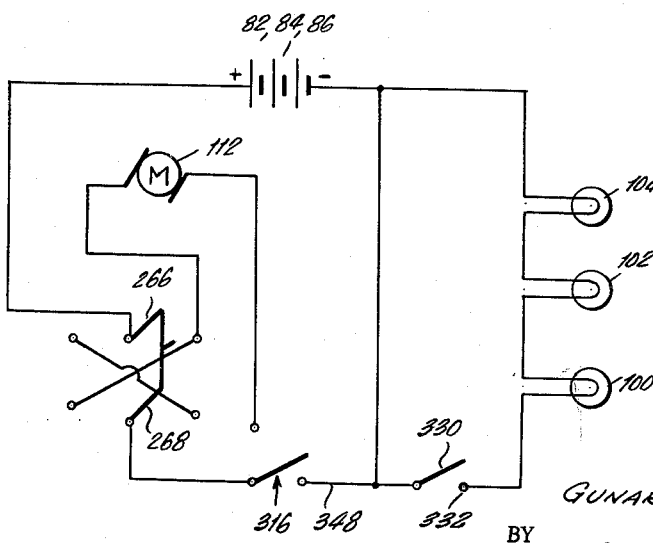
FIG. 20 is a schematic line diagram of the various electrical circuits employed in the invention.

Referring now specifically to FIGS. 17 through 19, it will be noted that the switch 316 is mounted on the chassis 22 in a manner so as to simulate conventional hand operating levers 510 which were provided in the prototype automobile for controlling operation of the vehicle. The hand operating lever 510 is connected to a shaft 512 rotatably disposed and mounted on the chassis 22. A suitable simulated mounting 514 similar in appearance to the mounting for the hand operating levers in the prototype is provided.

Mounted on the shaft 512 is a cam 516 which when in the position as shown in FIG. 19 does not engage the contact 314. However, when it is rotated clockwise as shown in FIG. 19 until the portion 520 of the cam most eccentric with respect to the shaft 512 engages the contact 314, it will press contact 314 into engagement with the contact 346 to complete an operative electrical circuit between the batteries and the motor.

The contact 314 is mounted by being disposed between the studs 530, 532 and 534 while the contact 336 is disposed between the studs 536, 538 and 540.

The hood 66 which is adapted to be mounted on the chassis in overlying relationship to the directional control mechanism 32 carries a steering column mounting tube 600 in which a steering rod 602 is rotatably mounted, the steering rod 602 terminating in a vertically downwardly extending end portion 604 which is adapted to engage between the furcations of a bifurcated member 606 integrally formed on the tie-rod 474 so that rotation of the steering wheel 608 mounted on the steering rod 602 will cause movement of the tie-rod and hence movement of the wheels to the right or left.

The operation of the toy vehicle 20 is started when the switch 316 is closed. An operative electrical circuit from the batteries 82, 84, 86 to the motor is had through the electric circuitry incorporated in the invention. If, for example, the vehicle had stopped with the various parts in the position as in FIG. 3, when the switch 316 is closed, there is an operative electrical circuit from the batteries through conductor 344, contacts 346 and 314, conductor 348, conductor 310, spring contact 286, contact member 266, pivot contact 262, conductor 296, to the motor back through conductor 298 to battery terminal 80. At the same time an operative electrical circuit is provided to the lights since the contacts 330 and 332 are closed. This will cause the shaft 196 to be driven through the reduction gears 116, 128, 130 and 132 driving the shaft 126 and worm 138 so as to drive the universal clutch 146 and thence the drive shaft 172 to drive the rear axle through the pinion 372 and ring gear 374 to drive the rear wheels 54 and 56 to move the car in a first direction. As soon as the cam 240 is rotated far enough that the cam 240 strikes the detent 278 it will move the slide 252 and hence the flipper 274 to a position while the contact 256 engages the contact 290 and the contact 268 engages the contact 288 reversing the polarity of the motor. At the same time the clutch cam 350 has engaged the clutch universal 146 to disengage the drive to the rear wheels. Further rotation of the shaft 198 in the opposite direction will cause the clutch cam to rotate to the position while the clutch universal and the universal teeth 144a and 146a are reengaged to drive the wheels in opposite directions. At the same time, the steering cam 352 is being rotated to turn the wheels in a predetermined direction dependent upon the shape of the cam 352. It is to be recognized that separate interchangeable cams 352 may be provided so that different patterns may be followed by the wheels during the operation of the car. With the shaft 198 now driving in a clockwise direction, it will move until the reversing cam 240 engages the detent 278 lifting the detent from the lowered position as shown in FIG. 4 to the position as shown in FIG. 1.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A toy vehicle comprising a chassis, front and rear wheels supporting said chassis, a mounting plate supported by said chassis, a reversible electric motor supported on said chassis, drive means for connecting said electric motor to at least some of said wheels, said drive means including a shaft journalled in said mounting plate, first cam means on said shaft, a slide movably mounted on said plate, said first cam means engaging said slide to reciprocate said slide upon turning of said first cam means first in one direction and then in the opposite direction, contact means mounted on said plate and connected to said slide, said contact means being electrically operatively connected to said drive means for controlling the direction of rotation of said drive means corresponding to turning of said shaft, said drive means including a clutch operatively engaged between said motor and said one wheel, and second cam means on said shaft engaging said clutch for actuating said clutch in timed relation to movement of said first cam means so that said clutch will be disengaged between periods of rotation of said cam in said one direction and in said other direction.

2. A toy vehicle comprising a chassis, front and rear wheels supporting said chassis, a mounting plate supported by said chassis, a reversible electric motor supported on said chassis, a source of electric power, an off-on switch connected to said source of electric power, drive means for connecting said electric motor to said rear wheels, said drive means including a shaft journalled in said mounting plate, a first cam on said shaft, a slide, guide means slidably mounting said slide on said plate, said first cam engaging said slide to reciprocate said slide upon turning of said shaft first in one direction and then in the opposite direction, a reversing switch mechanism on said plate, said reversing switch mechanism being actuated by said slide, said reversing switch mechanism being connected to said source of electric power and said motor for controlling polarity of electrical power supplied to said motor to control direction of travel of said vehicle, said drive means including a clutch operatively engaged between said motor and said rear wheels a second cam on said shaft for engaging and actuating said clutch in timed relation to movement of said first cam so that said clutch will be disengaged between periods of rotation of said first cam in said one direction and in said opposite direction whereby the vehicle will be moved by rotation of said rear wheels sequentially forwardly, stopped, rearwardly and again stopped.

3. A toy vehicle comprising a chassis, front and rear wheels supporting said chassis, a mounting plate supported by said chassis, a reversible electric motor supported on said chassis, a source of electric power, an off-on switch connected to said source of electric power, drive means for connecting said electric motor to said rear wheels, said drive means including a shaft journalled in said mounting plate, a first cam on said shaft, a slide, guide means slidably mounting said slide on said plate, said first cam engaging said slide to reciprocate said slide upon turning of said shaft first in one direction and then in the opposite direction, a reversing switch mechanism being actuated by said slide and to said source of electric power and said motor for controlling polarity of electrical power supplied to said motor to control direction of travel of said vehicle, said drive means including a clutch operatively engaged between said motor and said rear wheels, a second cam on said shaft for engaging and actuating said clutch in timed relation to movement of said first cam so that said clutch will be disengaged between periods of rotation of said rear wheels sequentially forwardly, stopped, rearwardly and again stopped, a third cam on said shaft, linkage means connected to said front wheels and including a cam follower engaging said third cam so that upon turning of said shaft said front wheels will be turned in conformance with the contours of said third cam.

4. A toy vehicle comprising a chassis, front and rear wheels supporting said chassis, a mounting plate supported by said chassis, a reversible electric motor supported on said chassis, drive means for connecting said electric motor to at least some of said wheels, said drive means including a shaft journalled in said mounting plate, first cam means on said shaft, a slide, guide means slidably mounting said slide on said plate, said first cam means engaging said slide to reciprocate said slide upon turning of said shaft first in one direction and then in the opposite direction, a pair of spaced contact members mounted on said plate, a pair of contact pivots mounted on said plate spaced from said contact members and electrically operatively connected to said motor, a contact flipper, a pair of reversing contacts carried by said contact flipper and pivotally engaging said contact pivots, spring means extending between said slide and said contact flipper urging said contact flipper toward said slide and said reversing contacts against said contact pivots so that said contact flipper is resiliently urged to move in accordance with movement of said slide with said reversing contacts successively engaging said contact members upon turning of said shaft, said drive means including a clutch operatively engaged between said motor and said wheels, and second cam means on said shaft engaging said clutch for actuating said clutch in timed relation to movement of said first cam means so that said clutch will be disengaged between periods of rotation of said cam in said one direction and in said other direction.

5. A toy vehicle comprising a chassis, front and rear wheels supporting said chassis, a mounting plate supported by said chassis, a reversible electric motor supported on said chassis, drive means for connecting said electric motor to at least some of said wheels, said drive means including a shaft journalled in said mounting plate, a cam on said shaft, a slide, guide means slidably mounting said slide on said plate, said cam engaging said slide to reciprocate said slide upon turning of said shaft first in one direction and then in the opposite direction, a pair of spaced contact members mounted on said plate, a pair of contact pivots mounted on said plate spaced from said contact members and electrically operatively connected to said motor, a contact flipper, a pair of reversing contacts carried by said contact flipper and pivotally engaging said contact pivots, and spring means extending between said slide and said contact flipper urging said contact flipper toward said slide and said reversing contacts against said contact pivots so that said contact flipper is resiliently urged to move in accordance with movement of said slide with said reversing contacts successively engaging said contact members upon turning of said shaft.

6. A toy vehicle comprising a chassis, front and rear wheels supporting said chassis, a mounting plate supported by said chassis, a reversible electric motor supported on said chassis, a source of electric power, a switch connected to said source of electric power for controlling power to said motor, drive means for connecting said electric motor to at least some of said wheels, said drive means including a shaft journalled in said mounting plate, a cam on said shaft, a slide, guide means slidably mounting said slide on said plate, said cam engaging said slide to reciprocate said slide upon turning of said shaft first in one direction and then in the opposite direction, a pair of spaced contact members mounted on said plate connected to said switch, a pair of contact pivots mounted on said plate spaced from said contact members and electrically operatively connected to said motor, a contact flipper, a pair of reversing contacts carried by said contact flipper and pivotally engaging said contact pivots, and spring means extending between said slide and said contact flipper urging said contact flipper toward said slide and said reversing contacts against said contact pivots so that said contact flipper is resiliently urged to move in accordance with movement of said slide with said reversing contacts successively engaging said contact members upon turning of said shaft to reverse the polarity of said source of electric power as delivered to said motor when said switch is closed.

7. A toy vehicle comprising a chassis, front and rear wheels supporting said chassis, a mounting plate supported by said chassis, a reversible electric motor supported on said chassis, drive means for connecting said electric motor to said rear wheels, said drive means including a shaft journalled in said mounting plate, a first cam on said shaft, a slide, guide means slidably mounting said slide on said plate, said first cam engaging said slide to reciprocate said slide upon turning of said shaft first in one direction and then in the opposite direction, a pair of spaced contact members mounted on said plate, a pair of contact pivots mounted on said plate spaced from said contact members and electrically operatively connected to said motor, a contact flipper, a pair of reversing contacts carried by said contact flipper and pivotally engaging said contact pivots, spring means extending between said slide and said contact flipper urging said contact flipper toward said slide and said reversing contacts against said contact pivots so that said contact flipper is resiliently urged to move in accordance with movement of said slide with said reversing contacts successively engaging said contact members upon turning of said shaft, said drive means including a clutch operatively engaged between said motor and said rear wheels, a second cam on said shaft for engaging and actuating said clutch in timed relation to movement of said first cam so that said clutch will be disengaged between periods of rotation of said first cam in said one direction and in said opposite direction whereby the vehicle will be moved by rotation of said rear wheels sequentially forwardly, stopped, rearwardly and again stopped, a third cam on said shaft, and linkage means connected to said front wheels and including a cam follower engaging said third cam so that upon turning of said shaft said front wheels will be turned in conformance with the contours of said third cam.

8. A toy vehicle comprising a chassis, front and rear wheels supporting said chassis, a mounting plate supported by said chassis, a reversible electric motor supported on said chassis, drive means for connecting said electric motor to said rear wheels, said drive means including a shaft journalled in said mounting plate, a first cam on said shaft, a slide, guide means slidably mounting said slide on said plate, said first cam engaging said slide to reciprocate said slide upon turning of said shaft first in one direction and then in the opposite direction, contact means mounted on said plate and connected to said slide, said contact means being electrically operatively connected to said drive means for controlling the direction of rotation of said drive means corresponding to turning of said shaft, said drive means including a clutch operatively engaged between said motor and said rear wheels, and second cam means on said shaft engaging said clutch for actuating said clutch in timed relation to movement of said first cam means so that said clutch will be disengaged between periods of rotation of said first cam in said one direction and in said other direction whereby the vehicle will be moved by rotation of said rear wheels sequentially forwardly, stopped, rearwardly and again stopped, a third cam on said shaft, linkage means connected to said front wheels and including a cam follower engaging said third cam so that upon turning of said shaft said front wheels will be turned in conformance with the contours of said third cam.

9. A directional control mechanism for a toy vehicle comprising a mounting plate, drive means including a shaft supported on said mounting plate, a slide, guide means slidably mounting said slide on said plate, means on said shaft engageable with said slide to reciprocate said slide upon turning of said shaft first in one direction and then in the opposite direction, a pair of spaced contact members mounted on said plate, a pair of contact pivots mounted on said plate spaced from said contact members and electrically operatively connected to said drive means, a contact flipper, a pair of reversing contacts carried by said contact flipper and pivotally engaging said contact pivots, and spring means extending between said slide and said contact flipper urging said contact flipper toward said slide and said reversing contacts against said contact pivots so that said contact flipper is resiliently urged to move in accordance with movement of said slide with said reversing contact successively engaging said contact members upon turning of said shaft.

10. A directional control mechanism for a toy vehicle comprising a mounting plate, drive means supported on said mounting plate and including cam means, and a slide movably mounted on said plate, said cam means engaging said slide to reciprocate said slide upon turning of said cam means first in one direction and then in the opposite direction, a pair of spaced contact members mounted on said plate, a pair of contact pivots mounted on said plate spaced from said contact members and electrically operatively connected to said drive means, a contact flipper, a pair of reversing contacts carried by said contact flipper and pivotally engaging said contact pivots, and spring means extending between said slide and said contact flipper urging said contact flipper toward said slide and said reversing contacts against said contact pivots so that said contact flipper is resiliently urged to move in accordance with movement of said slide with said reversing contacts successively engaging said contact members upon turning of said cam means.

11. A directional control mechanism for a driven member on a toy vehicle comprising a mounting plate, drive means connected to said driven member including a shaft supported on said mounting plate, a cam on said shaft, a slide, guide means slidably mounting said slide on said plate, a detent on said slide, said cam being engageable with said detent to reciprocate said slide upon turning of said cam first in one direction and then in the opposite direction, a pair of spaced contact members mounted on said plate, a pair of contact pivots mounted on said plate spaced from said contact members and electrically operatively connected to said drive means, a contact flipper, a pair of reversing contacts carried by said contact flipper and pivotally engaging said contact pivots, and spring means extending between said slide and said contact flipper urging said contact flipper toward said slide and said reversing contacts against said contact pivots so that said contact flipper is resiliently urged to move in accordance with movement of said slide with said reversing contacts successively engaging said contact members upon turning of said shaft.

12. A toy vehicle comprising a chassis, front and rear wheels supporting said chassis, a mounting plate supported by said chassis, a reversible electric motor supported on said chassis, a source of electric power, a switch connected to said source of electric power for controlling power to said motor drive means for connecting said electric motor to said rear wheels, said drive means including a shaft journalled in said mounting plate, a first cam on said shaft, a slide, guide means slidably mounting said slide on said plate, said first cam engaging said slide to reciprocate said slide upon turning of said shaft first in one direction and then in the opposite direction, a pair of spaced contact members mounted on said plate, a pair of contact pivots mounted on said plate spaced from said contact members and electrically operatively connected to said drive means, a contact flipper, a pair of reversing contacts carried by said contact flipper and pivotally engaging said contact pivots, spring means extending between said slide and said contact flipper urging said contact flipper toward said slide and said reversing contacts against said contact pivots so that said contact flipper is resiliently urged to move in accordance with movement of said slide with said reversing contacts successively engaging said contact members upon turning of said shaft to reverse the polarity of electric power as delivered from said source of electric power to said motor with said switch closed, said drive means including a clutch operatively engaged between said motor and said rear wheels, a second cam on said shaft for engaging and actuating said clutch in timed relation to movement of said first recited cam so that said clutch will be disengaged between periods of rotation of said first cam in said one direction and in said opposite direction whereby the vehicle will be moved by rotation of said rear wheels sequentially forwardly, stopped, rearwardly and again stopped, a third cam on said shaft, and linkage means connected to said front wheels and including a cam follower engaging said third cam so that upon turning of said shaft said front wheels will be turned in conformance with the contours of said third cam.

13. A toy vehicle comprising a chassis, front and rear wheels supporting said chassis, a mounting plate supported by said chassis, a reversible electric motor supported on said chassis, a source of electric power, an off-on switch connected to said source of power drive means for connecting said electric motor to said rear wheels, said drive means including a shaft journalled in said mounting plate, a first cam on said shaft, a slide, guide means slidably mounting said slide on said plate, said first cam engaging said slide to reciprocate said slide upon turning of said shaft first in one direction and then in the opposite direction, a pair of spaced contact members mounted on said plate and electrically connected to said on-off switch, a pair of contact pivots mounted on said plate spaced from said contact members and electrically operatively connected to said motor, a contact flipper, a pair of reversing contacts carried by said contact flipper and pivotally engaging said contact pivots, spring means extending between said slide and said contact flipper urging said contact flipper toward said slide and said reversing contacts against said contact pivots so that said contact flipper is resiliently urged to move in accordance with movement of said slide with said reversing contacts successively engaging said contact members upon turning of said shaft to reverse the polarity of said power delivered to said motor, said drive means including a clutch operatively engaged between said motor and said rear wheels, a second cam on said shaft for engaging and actuating said clutch in timed relation to movement of said first cam so that said clutch will be disengaged between periods of rotation of said first cam in said one direction and in said opposite direction whereby the vehicle will be moved by rotation of said rear wheels sequentially forwardly, stopped, rearwardly and again stopped, a third cam on said shaft, linkage means connected to said front wheels and including a cam follower engaging said third cam so that upon turning of said shaft said front wheels will be turned in conformance with the contours of said third cam, a plurality of electric lights on said chassis, a lamp switch electrically operatively connected to said electric lights and to said source of electric power, and a fourth cam on said shaft engaging said lamp switch for opening and closing said lamp switch in predetermined timed relation to operation of said vehicle.

14. A directional control mechanism according to claim 11 wherein said drive means includes a clutch operatively engaged between said shaft and said driven member, and another cam on said shaft for engaging and actuating said clutch in timed relation to movement of said first recited cam so that said clutch will be disengaged between periods of rotation of said shaft in said one direction and in said other direction.

References Cited in the file of this patent

UNITED STATES PATENTS

| | | |
|---|---|---|
| 2,625,831 | Saunders | Jan. 20, 1953 |
| 2,775,848 | Isaacson | Jan. 1, 1957 |
| 2,862,332 | Johnson | Dec. 2, 1958 |
| 2,943,418 | Smith | July 5, 1960 |
| 2,963,985 | Palmer et al. | Dec. 13, 1960 |

FOREIGN PATENTS

| | | |
|---|---|---|
| 1,085,079 | Germany | July 7, 1960 |

RICHARD C. PINKHAM, *Primary Examiner.*